(12) United States Patent
Vialleton et al.

(10) Patent No.: US 6,982,655 B2
(45) Date of Patent: Jan. 3, 2006

(54) METHOD AND INDICATOR FOR DISPLAYING INFORMATION SHOWING THE AIRSPEED TOLERANCE MARGINS FOR AN AIRCRAFT

(75) Inventors: Pascal Vialleton, Toulouse (FR); Martin Delporte, Tournefeuille (FR); Jean-Christophe Reinmuth, Blagnac (FR); Jacques Rosay, Toulouse (FR)

(73) Assignee: Airbus France, Toulouse (FR)

( * ) Notice: Subject to any disclaimer, the term of this patent is extended or adjusted under 35 U.S.C. 154(b) by 121 days.

(21) Appl. No.: 10/800,916

(22) Filed: Mar. 16, 2004

(65) Prior Publication Data

US 2004/0183699 A1 Sep. 23, 2004

(30) Foreign Application Priority Data

Mar. 20, 2003 (FR) .................................. 03 03413

(51) Int. Cl.
*G08B 23/00* (2006.01)
(52) U.S. Cl. ...................... 340/969; 340/959; 340/973; 340/967; 244/5; 244/72
(58) Field of Classification Search ................ 340/969, 340/915, 970, 971, 972, 973, 974, 977, 978, 340/979, 980, 981, 967, 959, 963, 961, 946–948; 244/5, 6, 72, 17, 11, 76 R
See application file for complete search history.

(56) References Cited

U.S. PATENT DOCUMENTS 4,149,148 A * 4/1979 Miller et al. .................. 345/27
4,638,437 A * 1/1987 Cleary et al. .................. 701/15
5,666,111 A * 9/1997 Servat et al. ................ 340/980
6,469,640 B2 * 10/2002 Wyatt .......................... 340/975

FOREIGN PATENT DOCUMENTS

EP 1008921 A1 6/2000
WO 0065423 11/2000

OTHER PUBLICATIONS

Preliminary Search Report dated Oct. 21, 2003 with English translation.

\* cited by examiner

*Primary Examiner*—Jeffery Hofsass
*Assistant Examiner*—Daniel Previl
(74) *Attorney, Agent, or Firm*—Stevens, Davis, Miller & Mosher, LLP

(57) ABSTRACT

Method and indicator for displaying information showing the airspeed tolerance margins for an aircraft.

The indicator comprises a central processing unit which selects, from a plurality of longitudinal scales, the longitudinal scale representative of the current aerodynamic configuration of the aircraft and a display means which presents on a display screen the selected longitudinal scale, which is mobile in the longitudinal direction, and whose position on the display screen depends on the current angle of attack of the aircraft, shown by a characteristic marker in a fixed position on the display screen across the longitudinal scale, the latter scrolling up and down relative to the characteristic marker as a function of the current angle of attack of the aircraft.

15 Claims, 2 Drawing Sheets

METHOD AND INDICATOR FOR DISPLAYING INFORMATION SHOWING THE AIRSPEED TOLERANCE MARGINS FOR AN AIRCRAFT

BACKGROUND OF THE INVENTION

The present invention relates to a method and an indicator for displaying information showing the airspeed tolerance margins for an aircraft.

DESCRIPTION OF THE PRIOR ART

It is well known that an indicator displaying the airspeed tolerance margins on a display screen, in particular on the Primary Flight Display (PFD) screen showing the primary flight parameters (airspeed, altitude, attitude, etc.), generally makes use of measurements made by at least one pressure sensor, notably for airspeed. Also, when this pressure sensor fails, the airspeed tolerance margin information, at least, is no longer available and can no longer be displayed. The pilot therefore no longer has access to this important information which can have very serious consequences for the aircraft flight control with especially a risk of flying in a prohibited range of airspeeds.

SUMMARY OF THE INVENTION

The object of the present invention is to provide a solution to these problems. It relates to a method for displaying information showing the airspeed tolerance margins for an aircraft, without using measurements from a pressure sensor.

In order to achieve this, according to the invention, said method according to the invention features the following steps:
a) the current angle of attack of the aircraft is determined;
b) a longitudinal scale is defined which is a function of the aircraft's current aerodynamic configuration and which is composed of several differentiated zones expressed in angles of attack and corresponding, respectively, to an allowed range of flight, to first and second unrecommended ranges of flight and to first and second prohibited ranges of flight; and
c) said longitudinal scale is presented on a display screen and, being mobile in the longitudinal direction, is able to scroll up and down said display screen, and its position on said display screen depends on the current angle of attack of the aircraft, which is indicated by a characteristic marker in a fixed position on said display screen across said longitudinal scale, said mobile longitudinal scale scrolling up and down relative to said characteristic marker as a function of the current angle of attack of the aircraft.

Accordingly, using only a measurement of the angle of attack and an appropriate longitudinal scale, the invention makes it possible to display information that replaces and behaves similarly to the airspeed parameter, and allows the aircraft to be flown safely with no flying knowledge other than that using airspeed as flight parameter.

In the framework of the present invention, it should be understood that the aircraft's aerodynamic configuration refers to the positions of the aircraft wing flaps and leading edges.

Advantageously, as a preliminary step, a plurality of longitudinal scales is defined respectively representative of different aerodynamic configurations of the aircraft, and at step b):

the current aerodynamic configuration of the aircraft is determined; and
the longitudinal scale representative of said current aerodynamic configuration of the aircraft is selected from said plurality of longitudinal scales.

To further advantage, said longitudinal scale comprises particular values of angle of attack, which correspond respectively to:
a first flight limit;
a second flight limit being higher than said first flight limit which, together with the latter, defines said allowed range of flight;
a third flight limit being lower than said first flight limit which, together with the latter, defines said first unrecommended range of flight, and which defines said first prohibited range of flight being any value below said third flight limit; and
a fourth flight limit being higher than said second flight limit which, together with the latter, defines said second unrecommended range of flight, and which defines said second prohibited range of flight being any value exceeding said fourth flight limit.

Accordingly, in order to define each of said longitudinal scales, it suffices to determine said corresponding first to fourth flight limits which are characteristic of the aerodynamic configuration (leading edges/flaps) of the aircraft and which allow the corresponding longitudinal scale to be constituted.

It is preferred that:
said first flight limit corresponds to the aircraft's stall airspeed augmented by a safety margin and it represents the minimum airspeed that can be set by the autopilot;
said second flight limit corresponds to the maximum speed that the aircraft can assume with all its flaps deployed and without risk to its structural integrity, augmented by a normal loading margin;
said third flight limit corresponds to the aircraft's stall airspeed; and
said fourth flight limit corresponds to said maximum speed that the aircraft can assume with all its flaps deployed and without risk to its structural integrity, augmented by a reduced loading margin.

In addition and advantageously, said longitudinal scale is displayed vertically on said display screen, and it is presented with the high angle of attack values displayed toward the bottom and the low angle of attack values toward the top.

In this manner, since the angle of attack and the airspeed of an aircraft depend inversely on each other, by displaying the high angles at the bottom and the low angles at the top, the pilot is presented with the similar behavior of a conventional scale (of airspeed tolerance margins) with which he is familiar, so that, when he accelerates, his airspeed measurement increases, and vice versa.

Moreover, the size of the display (of the longitudinal scale) is chosen in such a way as to approximate, in terms of dynamics, the airspeed behavior. For example, 1 cm could be taken to correspond to 2° of angle of attack.

Thus, the size and mode of variation (direction, airspeed) of the display are adapted so as to approximate the conventional behavior of an aircraft airspeed display.

Furthermore and advantageously, at step a), the current angle of attack value is filtered, at least when one of the following two conditions is ascertained: the outside air is calm or the outside air is turbulent.

In a preferred embodiment of the invention, said longitudinal scale and said characteristic marker only appear on the display screen when a main display is defective, in particular a conventional display which uses measurements from at least one pressure sensor. Thus, the present invention provides a solution to the aforementioned problems that arise with the display of airspeed tolerance margins when a pressure sensor is defective.

For this purpose, it is preferable to:
α) continuously monitor at least one of the aircraft's pressure sensors whose measurements are used by said main display; and
β) deduce that said main display is defective when a fault is detected in said pressure sensor.

In addition and advantageously, said scale and said characteristic marker are presented on the display screen only when the aircraft is in flight.

In one particular embodiment:
said different zones of the longitudinal scale are differentiated using different colors; and/or
said characteristic marker is a line drawn across said scale orthogonally to the longitudinal direction.

Moreover, in order to highlight the prohibited ranges of flight, the longitudinal scale advantageously includes:
a first written indication warning of a low airspeed of the aircraft in the zone corresponding to said first prohibited range of flight; and
a second written indication warning of a high airspeed of the aircraft in the zone corresponding to said second prohibited range of flight.

The present invention also relates to an aircraft flight indicator, designed to provide information showing airspeed tolerance margins, comprising a central processing unit and a means for displaying information received from said central processing unit which is fitted with at least one display screen.

According to the invention, said flight indicator has the following features:
it comprises, in addition, a first means of determining the current angle of attack of the aircraft and at least one database containing a plurality of longitudinal scales which depend on the aircraft's aerodynamic configuration and which are composed of several differentiated zones expressed as angles of attack and corresponding, respectively, to one allowed range of flight, to first and second unrecommended ranges of flight and to first and second prohibited ranges of flight;
said central processing unit selects, from the plurality of longitudinal scales, the longitudinal scale representative of the current aerodynamic configuration of the aircraft; and
said display means present on said display screen said selected longitudinal scale which, being mobile in the longitudinal direction, is able to scroll up and down said display screen, and whose position on said display screen depends on the current angle of attack of the aircraft, which is indicated by a characteristic marker in a fixed position on said display screen across said longitudinal scale, said mobile longitudinal scale scrolling up and down relative to said characteristic marker as a function of the current angle of attack of the aircraft.

Advantageously, said central processing unit filters the angle of attack value as determined by said first means, at least when the outside air is calm or turbulent.

In addition and advantageously, said flight indicator also comprises:
a second means for determining the current aerodynamic configuration of the aircraft; and/or
a detection means capable of detecting the failure of a main indicator, and said display means present said scale and said characteristic marker on the display screen, only when the failure of said main indicator is detected by said means of detection.

The present invention also relates to an indication device designed to provide the airspeed tolerance margins, said indication device comprising a main indicator capable of presenting the airspeed tolerance margins on a display screen.

A feature of this indication device, according to the invention, is that it additionally comprises an auxiliary indicator designed to present the airspeed tolerance margin information on a display screen when said main indicator is defective, and that said auxiliary indicator corresponds to the aforementioned flight indicator.

The figures in the appended drawing will help understand how the invention is implemented. In these figures, identical reference numbers designate similar elements.

DESCRIPTION OF THE PREFERRED EMBODIMENTS

Figure 1:
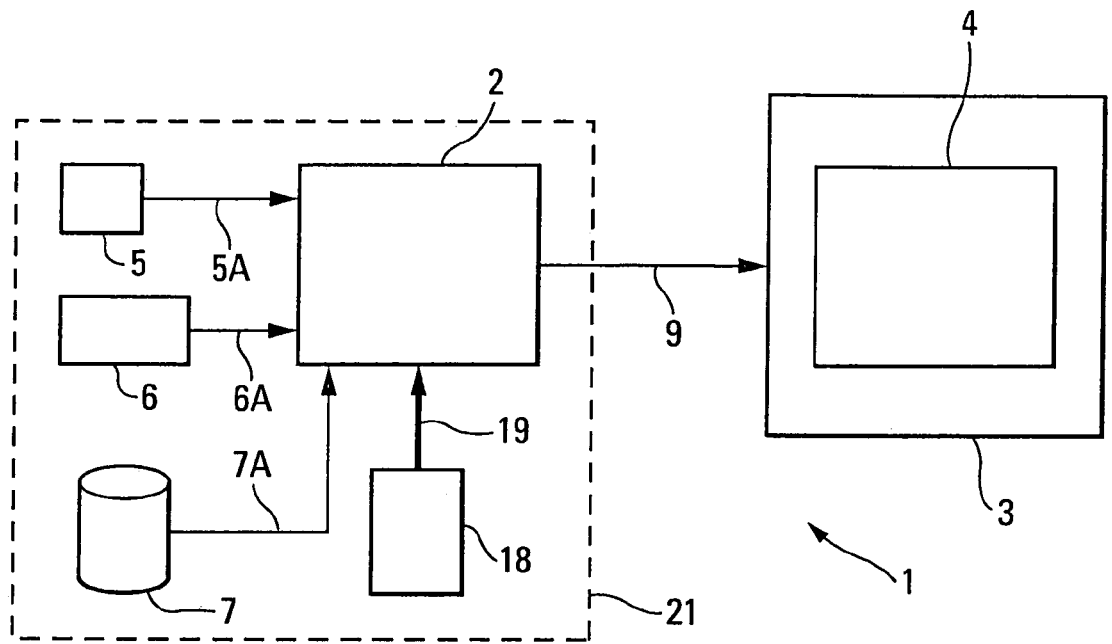
FIG. 1 is a block diagram of a flight indicator according to the invention.

The flight indicator 1, conforming to the invention and represented schematically in FIG. 1, is designed to provide information showing the airspeed tolerance margins of an aircraft, in particular a civilian passenger plane. This flight indicator 1 is of the type comprising a central processing unit 2 and a display means 3 fitted with a display screen 4, in particular a conventional display of the type PFD (Primary Flight Display).

Figure 2:
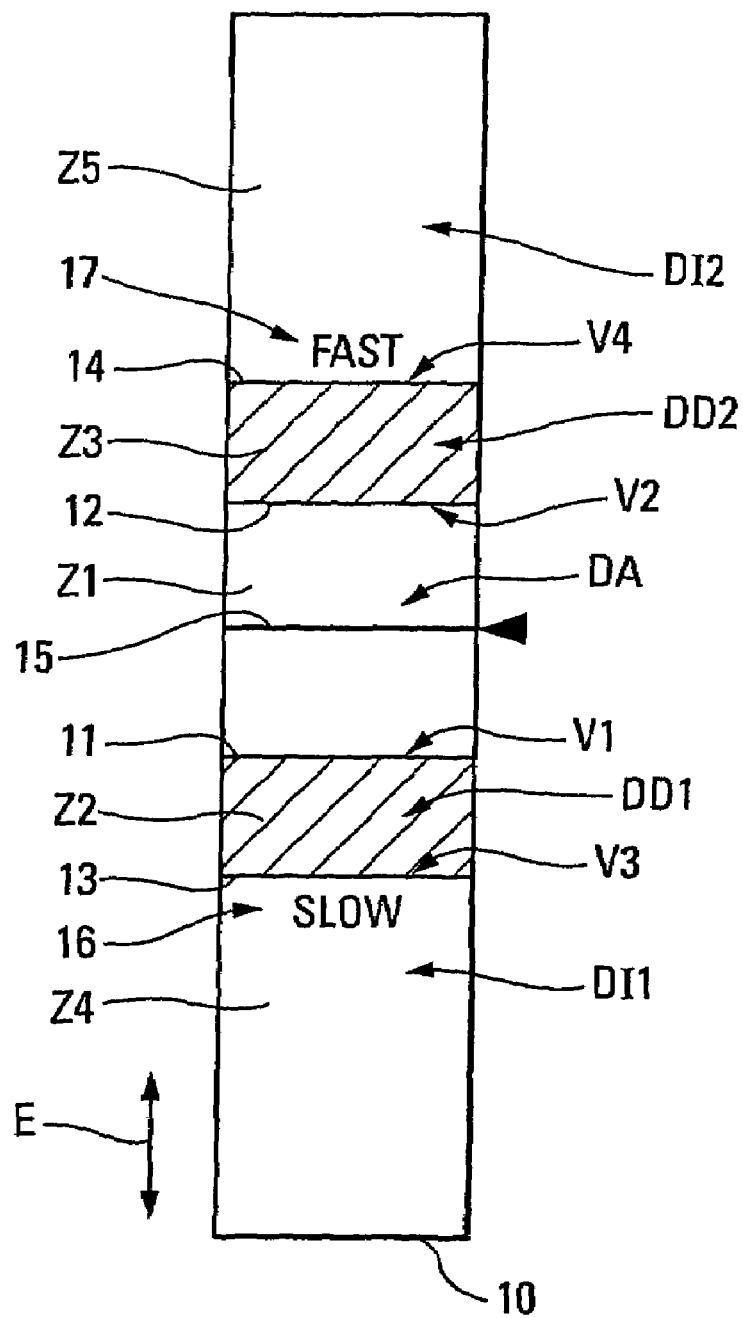
FIG. 2 shows schematically the information presented on a display screen by a flight indicator conforming to the invention.

According to the invention, said-flight indicator 1 additionally comprises a conventional means 5 of determining the current angle of attack of the aircraft and at least one database 7 which contains a plurality of longitudinal scales 10 which are a function of the aircraft's aerodynamic configuration and which are composed of several differentiated zones Z1 to Z5, which are:
depicted in FIG. 2;
delimited respectively by lines 11 to 14 (representing, respectively, flight limits V1 to V4 explained below);
expressed as angles of attack; and
corresponding respectively to an allowed range of flight DA, to first and second unrecommended ranges of flight DD1, DD2 and to first and second prohibited ranges of flight DI1, DI2.

In addition, according to the invention:
said central processing unit 2, which is connected via links 5A and 7A, respectively, to the means 5 and to the database 7, selects from amongst the plurality of longitudinal scales the one that represents the current aerodynamic configuration of the aircraft; and
said display means 3 receive information from said central processing unit 2 via a link 9 and presents on said display screen 4 said selected longitudinal scale 10 which, being mobile in the longitudinal direction as indicated by the double-headed arrow E, is able to scroll up and down said display screen 4, and whose position on said display screen 4 depends on the current angle of attack α of the aircraft, which is shown by a characteristic marker 15 in a fixed position on said display screen 4 across said longitudinal scale 10, this said longitudinal scale 10 thus scrolling up and down relative to said characteristic marker 15 as a function of the current angle of attack α of the aircraft.

In one particular embodiment of the invention, the flight indicator 1 additionally comprises a means 6 for determining the current aerodynamic configuration of the aircraft, and said central processing unit 2, being connected via a link 6A to this means 6, selects from amongst said plurality of longitudinal scales the one that represents the current aerodynamic configuration of the aircraft, as determined by said means 6.

Accordingly, with only a measurement of the angle of attack α and an appropriate longitudinal scale 10, thanks to the invention the flight indicator 1 is able to generate information that replaces, and behaves similarly to the airspeed, and allows the aircraft to be flown safely with no flying knowledge other than that using airspeed as flight parameter.

In addition and advantageously, said longitudinal scale 10 is displayed vertically on said display screen 4, and it is presented with the high angle of attack values toward the bottom and the low angle values toward the top.

In this manner, since the angle of attack and the airspeed depend inversely on each other, by displaying the high angles at the bottom and the low angles at the top, the pilot is presented with the similar behavior of a conventional scale (of airspeed tolerance margins) with which he is familiar, so that, when he accelerates, his airspeed measurement increases, and vice versa.

Moreover, the size of the display of the scale 10 is chosen in such a way as to approximate, in terms of dynamics, the airspeed behavior. For example, 1 cm could be taken to correspond to 2° of angle of attack.

Thus, the size and mode of variation (direction, airspeed) of the display are adapted so as to approximate the conventional behavior of an aircraft airspeed display.

Furthermore and advantageously, said longitudinal scale 10 comprises particular angle of attack values, which correspond respectively to:
 a first flight limit V1;
 a second flight limit V2 being higher than said first flight limit V1 which, together with the latter, defines said allowed range of flight DA;
 a third flight limit V3 being lower than said first flight limit V1 which, together with the latter, defines said first unrecommended range of flight DD1, and which defines said first prohibited range of flight DI1 being any value below said third flight limit V3; and
 a fourth flight limit V4 being higher than said second flight limit V2 which, together with the latter, defines said second unrecommended range of flight DD2, and which defines said second prohibited range of flight DI2 being any value exceeding said fourth flight limit.

Consequently, to define each of said longitudinal scales, it suffices to determine said corresponding first to fourth flight limits V1 to V4 which are characteristic of a particular aerodynamic configuration (leading edges/flaps) of the aircraft. Said flight limit values V1 to V4 are then stored in said database 7.

In a preferred embodiment:
 said first flight limit V1 corresponds to the aircraft's stall airspeed augmented by a safety margin and it represents the minimum airspeed that can be set by the autopilot;
 said second flight limit V2 corresponds to the maximum speed that the aircraft can assume with all its flaps deployed and without risk to its structural integrity, augmented by a normal loading margin;
 said third flight limit V3 corresponds to the aircraft's stall airspeed; and
 said fourth flight limit V4 corresponds to the maximum speed that the aircraft can assume with all its flaps deployed and without risk to its structural integrity, augmented by a reduced loading margin.

As previously indicated, said flight limits V1, V2, V3 and V4 depend on the aerodynamic configuration of the aircraft, in other words on the positions of the aircraft wing flaps and leading edges.

It is known that the flight limits indicated in terms of angle of attack are constant for a given aerodynamic configuration, whatever the mass and altitude of the aircraft. However, the corresponding limits indicated in terms of airspeed depend not only on the aerodynamic configuration, but also on the mass and altitude of the aircraft. These are obtained by inputting the angle of attack limits into the lift equation for the aircraft. For a given aerodynamic configuration, the invention amounts to choosing predetermined limit values in terms of angle of attack so as to guarantee that, whatever the flight conditions (mass, altitude) of the aircraft for this aerodynamic configuration, the allowed airspeed limits will not be violated (Vstall, operational Vmax etc.) In practice, this amounts to choosing a range of flight for the aircraft, narrower than the total permissible range of flight, within which the aircraft will definitely respect these limits.

Preferably, the transition between two successive zones Z1 to Z5 of the scale 10 is attenuated and filtered by the central processing unit 2.

For this purpose, the angle of attack value used is filtered so as to make the behavior of scale 10 resemble more closely an airspeed scale, in calm air as well as in turbulence. Indeed:
 in calm air, moving the flight control column causes an oscillatory variation in the angle of attack before it stabilizes at its new level. The airspeed also varies, but without oscillations. The aim of the filtering is to remove the oscillations in the angle of attack in such a way that the scale 10 behaves similarly to an airspeed scale; and
 in turbulent air, the angle of attack probe signals are filtered in order to avoid vibrations in the scale 10 where the airspeed is actually stable.

As may be seen in FIG. 2:
 the zones Z1 to Z5 of longitudinal scale 10 are differentiated from one another (as illustrated by the hatching on the intermediate zones Z2 and Z3), preferably using different colors. For example, the zone Z1 (allowed range of flight DA) may be colored green, the zones Z2 and Z3 (flight ranges not recommended DD1 and DD2) may be colored orange, and the zones Z4 and Z5 (prohibited ranges of flight DI1 and DI2) may be colored red; and
 the characteristic marker 15 is, for example, a yellow line drawn across the scrolling scale 10 orthogonally to its longitudinal direction and which can have a triangular pointer at one end.

Furthermore, in order to highlight the prohibited ranges of flight DI1 and DI2, on the longitudinal scale 10, in addition to the red color, the following are provided:

- a first written indication 16 (for example, "SLOW") warning of a low airspeed of the aircraft in the zone Z4 relating to said first prohibited range of flight DI1; and
- a second written indication 17 (for example, "FAST") warning of a high airspeed of the aircraft in the zone Z5 relating to the second prohibited range of flight DI2.

Consequently, the pilot must control the aircraft airspeed in such a manner that the marker line 15 (corresponding to the current angle of attack a which is representative of the effective airspeed of the aircraft) be positioned preferably in the zone Z1 (allowed range of flight DA) of the scale 10, or possibly in one of the zones Z2 or Z3 (unrecommended ranges of flight DD1 and DD2) of this scale 10, whilst however avoiding either of the zones Z4 or Z5 (prohibited ranges of flight DI1 or DI2) being reached.

Furthermore, according to the invention, said display means 3 present said scale 10 and said characteristic marker 15 on the display screen 4 only when a main display is defective.

To this end, the flight indicator 1 conforming to the invention additionally comprises a detection means 18 which is connected via a link 19 to the central processing unit 2 and which is designed to detect the failure of a main indicator (not shown in FIG. 1), and said display means 3 are instructed by the central processing unit 2 to present said scale 10 and said characteristic marker 15 on the display screen 4, only when the failure of said main indicator is detected by said detection means 18.

For this purpose, in one particular embodiment:

- said detection means 18 continuously monitors at least one conventional pressure sensor (not shown) on the aircraft, whose measurements are used by said main display 22 (FIG. 3); and
- when said detection means 18 detects a failure of said pressure sensor, this detection means 18 or the central processing unit 2 deduces therefrom that said main display 22 is defective.

Thus, the invention allows information showing the airspeed tolerance margins to be displayed without interruption, even in the event of a failure of the conventional main display 22, a capability that provides enhanced flight safety.

In addition and preferably, said display means 3 present said scale 10 and said characteristic marker 15 on the display screen 4 only when the aircraft is in flight.

Figure 3:
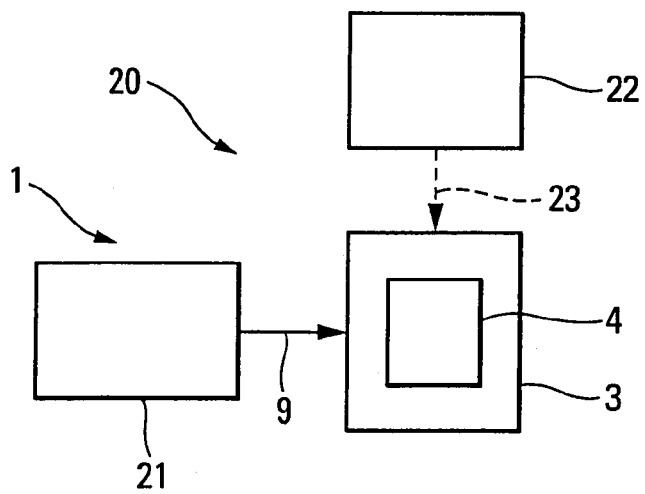
FIG. 3 is a schematic overview of an indication device conforming to the invention which comprises a flight indicator such as that shown in FIG. 1.

In one particular embodiment shown in FIG. 3, the flight indicator 1 according to the invention and comprising the combination 21 of means 2, 5, 6 and 18, as well as the display means 3, constitutes part of an indication device 20 that also comprises a conventional main indicator 22.

This main indicator 22 is designed to display, preferably without interruption, the airspeed tolerance margins of the aircraft, either on a specific display screen (not shown) or on the display screen 4 of the display means 3, by way of a link 23 represented as a dashed line. In this case, the flight indicator 1 according to the invention is preferably an auxiliary indicator which displays the aforementioned information showing airspeed tolerance margins only when the detection means 18 has detected a failure of said main indicator 22.

What is claimed is:

1. A method for displaying information showing the airspeed tolerance margins for an aircraft according to which:

a) the current angle of attack of the aircraft is determined;

b) a longitudinal scale is defined which is a function of the aircraft's current aerodynamic configuration and which is composed of several differentiated zones expressed in angles of attack and corresponding, respectively, to an allowed range of flight, to first and second unrecommended ranges of flight and to first and second prohibited ranges of flight, said longitudinal scale comprising particular values of angle of attack corresponding respectively to:
   - a first flight limit which corresponds to the aircraft's stall airspeed augmented by a safety margin and which represents the minimum airspeed that can be set by the autopilot;
   - a second flight limit being higher than said first flight limit which, together with the latter, defines said allowed range of flight, said second flight limit corresponding to the maximum speed that the aircraft can assume with all its flaps deployed and without risk to its structural integrity, augmented by a normal loading margin;
   - a third flight limit being lower than said first flight limit which, together with the latter, defines said first unrecommended range of flight, and which defines said first prohibited range of flight being any value below said third flight limit, said third flight limit corresponding to the aircraft's stall airspeed; and
   - a fourth flight limit being higher than said second flight limit which, together with the latter, defines said second unrecommended range of flight, and which defines said second prohibited range of flight being any value exceeding said fourth flight limit, said fourth flight limit corresponding to the maximum speed that the aircraft can assume with all its flaps deployed and without risk to its structural integrity, augmented by a reduced loading margin; and c) said longitudinal scale is presented on a display screen and, being mobile in the longitudinal direction, is able to scroll up and down said display screen, and whose position on said display screen depends on the current angle of attack of the aircraft, which is indicated by a characteristic marker in a fixed position on said display screen across said longitudinal scale, said mobile longitudinal scale scrolling up and down relative to said characteristic marker as a function of the current angle of attack of the aircraft.

2. The method as claimed in claim 1, wherein, as a preliminary step, a plurality of longitudinal scales are defined which are respectively representative of different aerodynamic configurations of the aircraft, and wherein at step b):

the current aerodynamic configuration of the aircraft is determined; and the longitudinal scale representative of said current aerodynamic configuration of the aircraft is selected from said plurality of longitudinal scales.

3. The method as claimed in claim 1, wherein said longitudinal scale is displayed vertically on said display screen, and wherein it is presented with the high angle of attack values toward the bottom and the lower angle of attack values toward the top.

4. The method as claimed in claim 1, wherein, at step a), the current angle of attack value is filtered, at least when the outside air is calm or when the outside air is turbulent.

5. The method as claimed in claim 1, wherein said scale and said characteristic marker are presented on the display screen only when a main display is defective.

6. The method as claimed in claim 5, wherein:
α) at least one of the aircraft's pressure sensors whose measurements are used by said main display is continuously monitored; and
β) when a fault is detected in said pressure sensor, it is accordingly deduced that said main display is defective.

7. The method as claimed in claim 1, wherein said scale and said characteristic marker are presented on the display screen only while the aircraft is in flight.

8. The method as claimed in claim 1, wherein said zones of the longitudinal scale are differentiated from each other using different colors.

9. The method as claimed in claim 1, wherein said characteristic marker is a line drawn across said scale and is orthogonal to the longitudinal direction of the scale.

10. The method as claimed in claim 1, wherein, on the longitudinal scale, is provided:
a first written indication warning of a low airspeed of the aircraft in the zone relating to said first prohibited range of flight; and
a second written indication warning of a high airspeed of the aircraft in the zone relating to said second prohibited range of flight.

11. An aircraft flight indicator designed to provide information showing the airspeed tolerance margins, said flight indicator comprising:
a first means of determining the current angle of attack of the aircraft;
at least one database containing a plurality of longitudinal scales which depend on the aircraft's aerodynamic configuration and which are composed of several differentiated zones expressed as angles of attack and corresponding, respectively, to one allowed range of flight, to first and second unrecommended ranges of flight and to first and second prohibited ranges of flight, each of said longitudinal scales comprising particular values of angle of attack corresponding respectively to:
a first flight limit which corresponds to the aircraft's stall airspeed augmented by a safety margin and which represents the minimum airspeed that can be set by the autopilot;
a second flight limit being higher than said first flight limit which, together with the latter, defines said allowed range of flight, said second flight limit corresponding to the maximum speed that the aircraft can assume with all its flaps deployed and without risk to its structural integrity, augmented by a normal loading margin;
a third flight limit being lower than said first flight limit which, together with the latter, defines said first unrecommended range of flight, and which defines said first prohibited range of flight being any value below said third flight limit, said third flight limit corresponding to the aircraft's stall airspeed; and
a fourth flight limit being higher than said second flight limit which, together with the latter, defines said second unrecommended range of flight, and which defines said second prohibited range of flight being any value exceeding said fourth flight limit, said fourth flight limit corresponding to the maximum speed that the aircraft can assume with all its flaps deployed and without risk to its structural integrity, augmented by a reduced loading margin;
a central processing unit which selects, from said plurality of longitudinal scales, the longitudinal scale representative of the current aerodynamic configuration of the aircraft; and
a display means which presents on a display screen said selected longitudinal scale which, being mobile in the longitudinal direction, is able to scroll up and down said display screen, and whose position on said display screen depends on the current angle of attack of the aircraft, which is indicated by a characteristic marker in a fixed position on said display screen across said longitudinal scale, said mobile longitudinal scale scrolling up and down relative to said characteristic marker as a function of the current angle of attack of the aircraft.

12. The flight indicator as claimed in claim 11, wherein it additionally comprises a second means for determining the current aerodynamic configuration of the aircraft.

13. The flight indicator as claimed in claim 11, wherein said central processing unit filters the current angle of attack value as determined by said first means, at least when the outside air is calm or turbulent.

14. The flight indicator as claimed in claim 11, wherein it additionally comprises a detection means capable of detecting a failure of a main indicator, and wherein said display means present said scale and said characteristic marker on the display screen only when the failure of said main indicator is detected by said detection means.

15. An indication device designed to provide information on the airspeed tolerance margins, said indication device comprising a main indicator capable of presenting the airspeed tolerance margins on a display screen, wherein it additionally comprises an auxiliary indicator designed to present information on the airspeed tolerance margins on a display screen when said main indicator is defective, and wherein said auxiliary indicator corresponds to the flight indicator as claimed in claim 11.

* * * * *